E. D. HAVEN.
Elevator.
No. 218,022. Patented July 29, 1879.
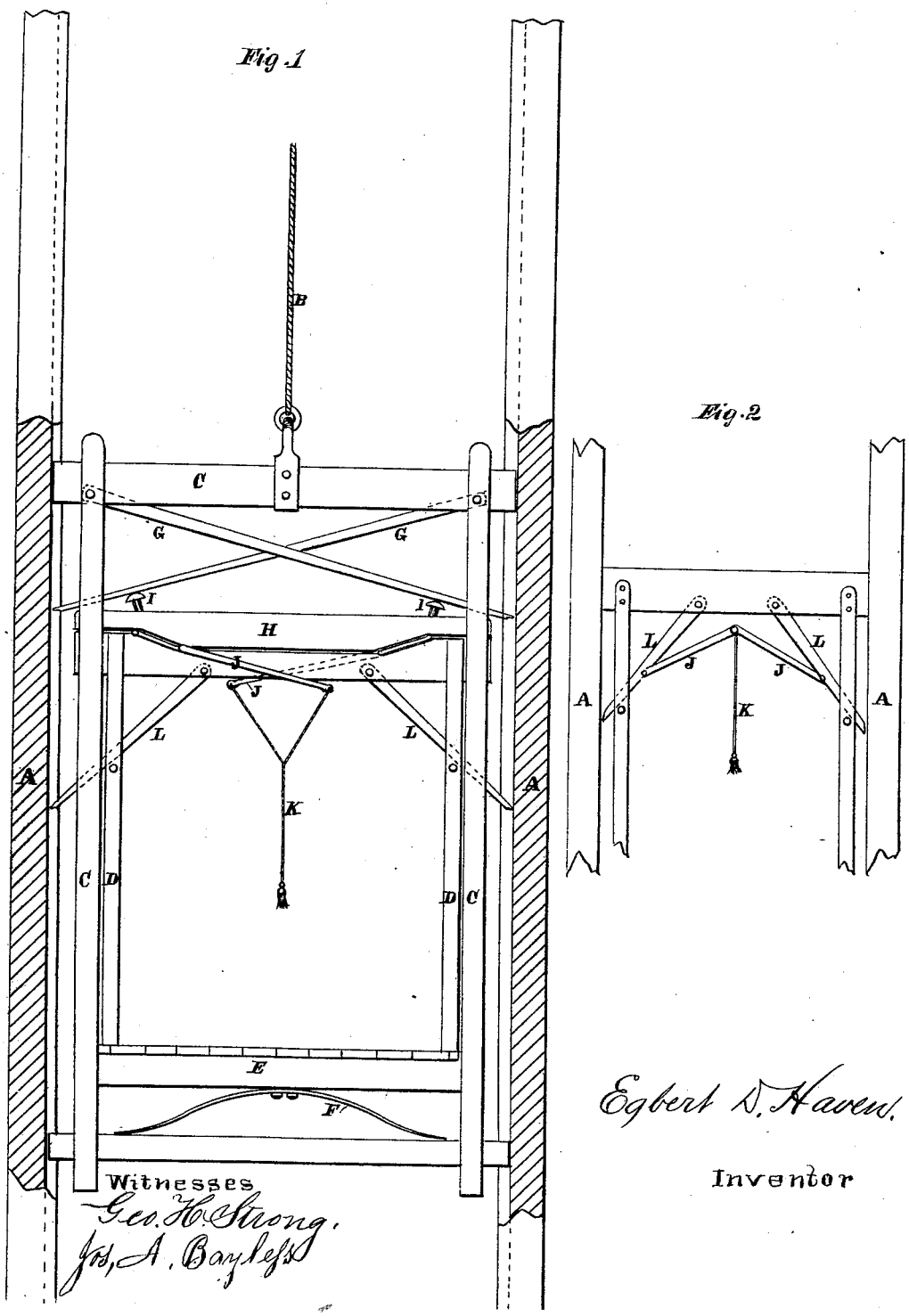
Witnesses
Geo. H. Strong.
Jos. A. Bayless
Egbert D. Haven.
Inventor

UNITED STATES PATENT OFFICE

EGBERT D. HAVEN, OF PORTLAND, OREGON.

IMPROVEMENT IN ELEVATORS.

Specification forming part of Letters Patent No. 218,022, dated July 29, 1879; application filed February 6, 1879.

*To all whom it may concern:*

Be it known that I, EGBERT D. HAVEN, of the city of Portland, county of Multnomah, and State of Oregon, have invented an Improvement in Elevators; and I hereby declare the following to be a full, clear, and exact description thereof.

My invention relates to certain improvements in elevators or hoists, such as are employed in stores or buildings; and it consists in the combination of an outer and an inner frame or cage, the inner one resting upon springs within the outer one. Each of these frames or cages has its independent set of safety-catches, which are operated successively if the rope breaks or the elevator descends too suddenly. In addition to these, a supplemental device is provided which may be controlled by the operator or passenger, the whole apparatus being more fully described by reference to the accompanying drawings, in which—

Figure 1 is an elevation or side view of my apparatus. Fig. 2 is a modification.

A A are the guides or side timbers between which the cage moves, being suspended by the rope B. The cage is composed of two separate and independent frames. The outer frame, C, may be constructed of wood, or it may have a top and bottom timber or frame united by iron rods. The inner cage, D, is complete, and moves up or down within the outer one, being properly guided. The floor or bottom timbers, E, of the inner cage rest upon springs F, which stand upon the base of the outer frame, as shown. This construction gives the inner cage a movement within the outer one, and relieves it of jar in case of sudden stoppage, as well as assists in operating the safety-catches, as will be more fully described hereinafter.

Two stout arms, G, are pinned to the upper part of the outer frame of the cage, and cross each other at an angle so that their free ends rest upon the top of the inner cage, and their sharpened points stand near the inner faces of the guide-timbers as the cage moves ordinarily. In order to adjust these levers, a timber, H, is fitted to the top of the inner cage, D, and adjustable plates or screws I serve to raise or depress the points of the catches, so that they will lie nearer or farther from the guide-timbers. Lever-arms J are so pivoted that their outer ends serve to lift the bar H when their inner ends are drawn down by the cord K, which hangs within the cage. This construction allows the passenger to seize the cord, and, by pulling it, raise the bar H, which thus forces the ends of the safety-catches G up until they catch and penetrate the guides and stop the cage. This places the cage within control of the occupant, and if the rope should break the instinct to grasp the rope might enable him to stop the cage before it had fallen far.

Safety-arms L are pinned to the top of the inner cage, and they pass through the sides at an angle, as shown, so that their outer ends stand near the guide-timbers, resting on the outer frame.

The operation will then be as follows: The weight upon the inner cage will depress the springs F, upon which it is borne, and the screws or adjusters I must be set so that the safety-arms will not touch the guides with the lightest load it may carry.

If the rope should break, or any sudden fall of the cage take place, the first downward movement of the outer cage or frame would be accelerated by the action of the springs F, as they recover from the pressure, and the outer cage would move more rapidly than the inner one. This will, by the action of the bar H against the ends of the arms G, force them up and outward until they catch and penetrate the guide-timbers A, thus stopping the outer cage.

The momentum of the inner cage will carry it down within the outer one until the catches or arms L have also been forced out into the guides, and this successive action will relieve the outer cage and the arms G of the strain of the sudden stoppage.

The springs F will receive the inner cage and bring it to a gradual stop, relieving it of all jar or jolt.

By this combination of devices I am enabled to cause the safety-catches to act successively and automatically, and thus relieve them of the strain of a fall. At the same time the passenger may at any time throw the safety-catches into action by pulling the cord K, attached to the levers J.

Having thus described my invention, what I claim as new, and desire to secure by Letters Patent, is—

1. The cage consisting of the outer and inner frames, C D, in combination with the springs F, whereby the inner cage is relieved from concussion and jar, substantially as herein described.

2. The frame or cage D, supported upon the outer frame, C, by the springs F, in combination with the safety-arms G, pivoted to the outer cage, and having their free ends so placed that a relative upward movement of the inner cage will force the arms G outward to catch the guides, substantially as herein described.

3. The arms G, in combination with the bar H, levers J, and cords K, whereby the arms G may be thrown out by the occupant of the cage, substantially as herein described.

4. The cage D, moving within the frame C, and resting upon the springs F, in combination with the safety-arms G, secured to the frame C, and the arms L, secured to the cage D, said arms being operated successively, substantially as and for the purpose herein described.

5. The improvement in elevators consisting in supporting the cage D by means of a spring or springs, F, said springs serving to accelerate the action of the arms G, substantially as herein described.

In witness whereof I have hereunto set my hand.

EGBERT D. HAVEN.

Witnesses:
   GEO. H. STRONG,
   FRANK A. BROOKS.